United States Patent

[11] 3,602,962

| [72] | Inventors | Magne Odegaard;<br>Sverre Narmo, both of Lena, Norway |
|---|---|---|
| [21] | Appl. No. | 795,942 |
| [22] | Filed | Feb. 3, 1969 |
| [45] | Patented | Sept. 7, 1971 |
| [73] | Assignee | Ringsted Jernstoberi & Maskinfabrik A/S<br>Ringsted, Denmark |
| [32] | Priority | Feb. 3, 1968 |
| [33] | | Norway |
| [31] | | 431/68 |

[54] MACHINES FOR SIMULTANEOUS MOLDING OF A NUMBER OF CONCRETE PIPES
8 Claims, 5 Drawing Figs.

[52] U.S. Cl. ................................................ 25/30 R
[51] Int. Cl. ........................................ B28b 21/16
[50] Field of Search ............................................ 25/30 M, 31, 33, 39, 40

[56] References Cited
UNITED STATES PATENTS

| 2,185,597 | 2/1940 | Klemschofski ............... | 25/30 M |
| 3,239,591 | 3/1966 | Wendt ......................... | 25/30 M X |
| 3,483,600 | 12/1969 | Moore .......................... | 25/30 M |

Primary Examiner—J. Spencer Overholser
Assistant Examiner—John S. Brown
Attorney—Ernest F. Marmorek ABSTRACT: A machine for the simultaneous molding of a number of concrete pipes, comprising a stationarily arranged table, a number of outer molds arranged in a row above said table each axially displaceable between a lower molding position and an upper idle position, in which the latter it is positioned at a distance above the table greater than the length of the pipes to be molded, for each outer mold a core having inner vibrating means and being displacable from a lower position, in which its uppermost end is positioned below the upper surface of the table, upwards through an opening in the table into the outer mold, when the latter is in its lower molding position, during which movement of the cores concrete is filled into the outer molds to fill up the mold spaces between the same and the core. During the molding the lower end of each outer mold is closed by means of a supporting ring having a major outer diameter greater than the major diameter of the pipe to be molded and being arranged on the table prior to the downward displacement of the outer mold, so that, after the molding operation has been finished, and the outer molds have been displaced upwards again to their idle positions and the cores have been retracted downward from the molded pipe into their lower positions, each just molded pipe is supported only by the supporting ring. The machine is further provided with a slide reciprocably arranged on the table and displaceable transverse to the direction of the row of molds between a first position, in which its slide edge is positioned in front of the supporting rings, and a rear position at the other side of the row, so that during said displacement the slide engages the supporting rings and thereby slide the same and, consequently, the pipes supported by the rings, along the table rearwards in the machine, whereby the rings engage corresponding rings supporting previously molded pipes and are displacing these further supporting rings with the pipes supported thereby further ahead, whereby all previously molded pipes still positioned on the table or behind the same are brought to be collected in a close assembly, in which the supporting rings owing to their diameter being greater than the major diameters of the pipes, and in spite of engaging each other ensure sufficient space between the pipes to prevent the same in engaging each other and thereby being disturbed. Therefore pipes have to be removed from the machine only at great intervals in spite of a high capacity of the machine.

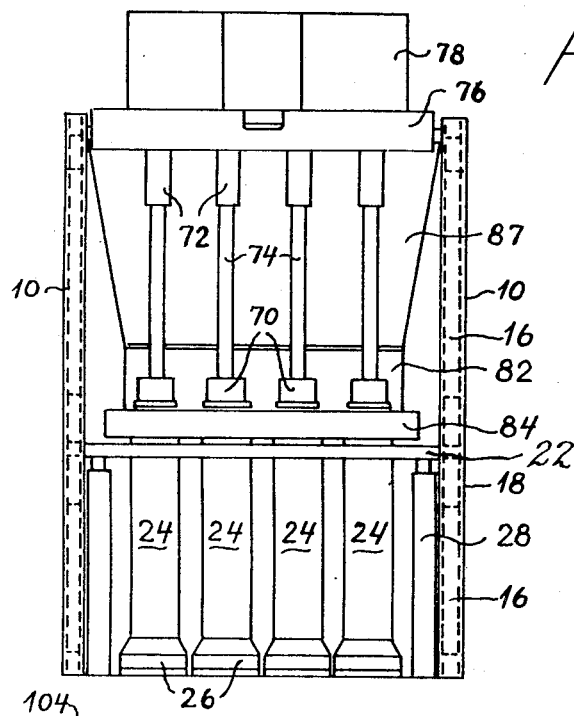
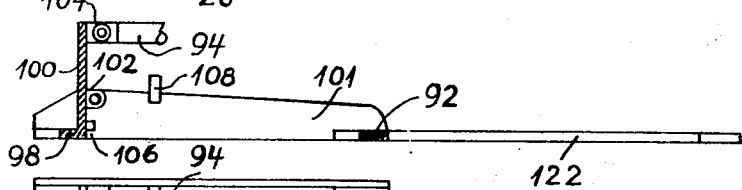
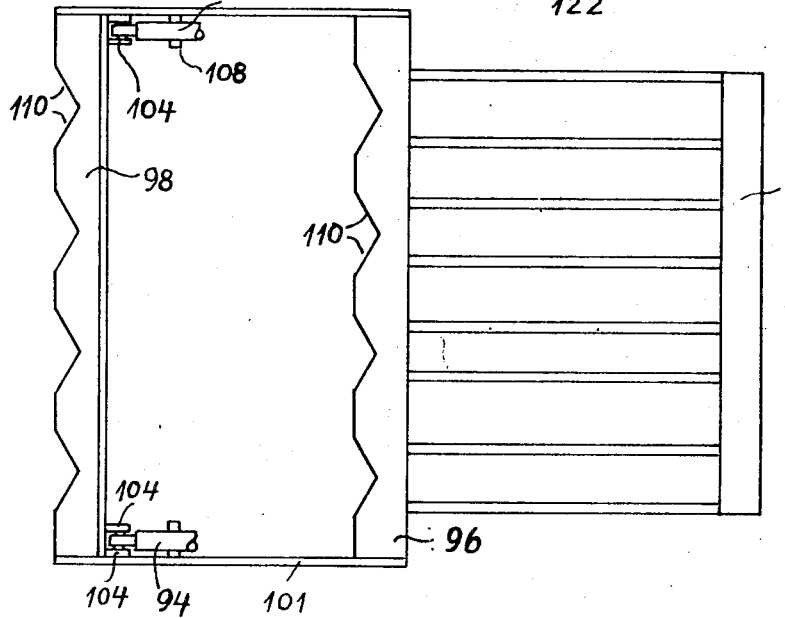

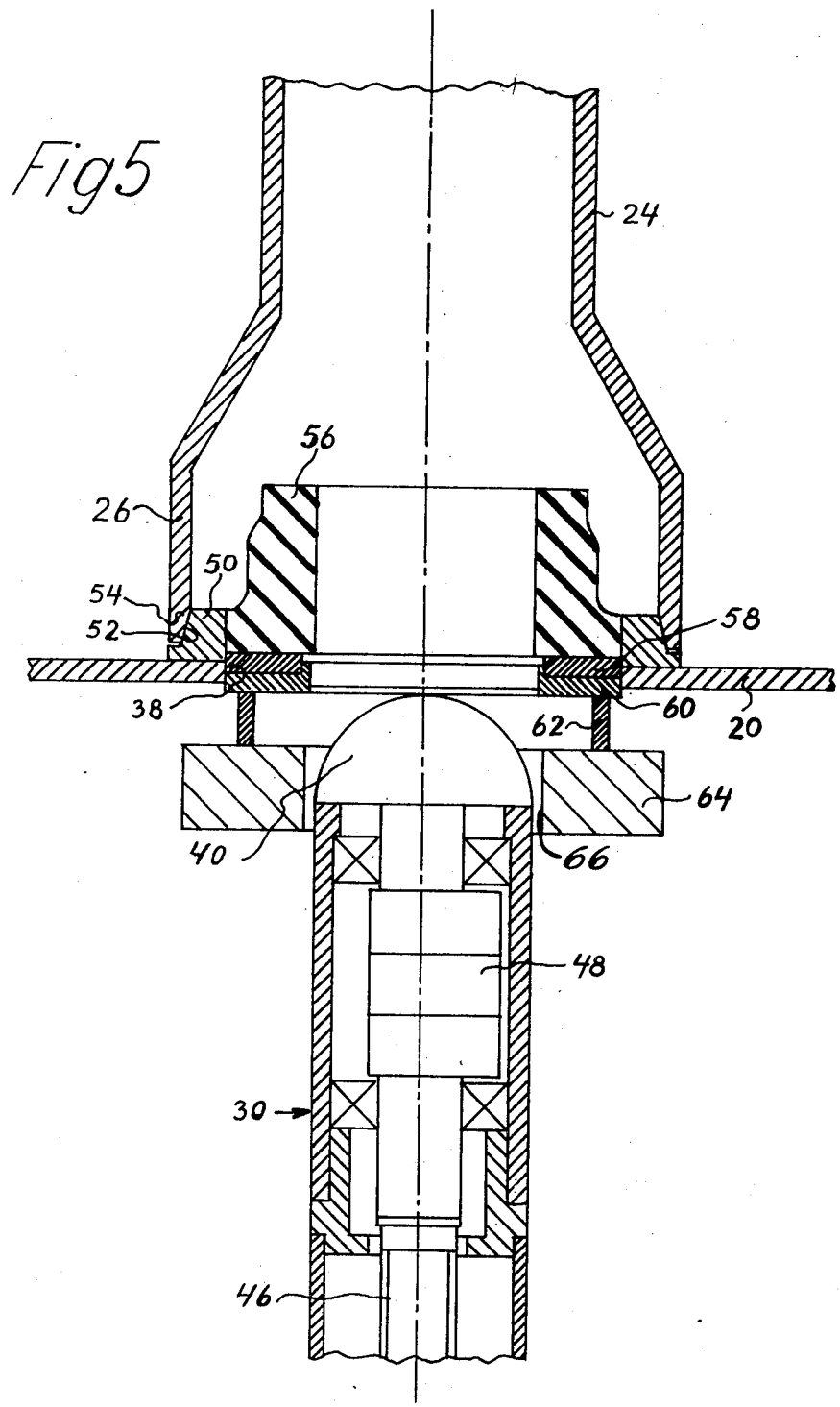

MACHINES FOR SIMULTANEOUS MOLDING OF A NUMBER OF CONCRETE PIPES

This invention relates to a machine for the simultaneous molding of a number of concrete pipes and of the type which is provided with a number of outer molds arranged in a row and being movable between an upper idle position and a lower molding position; for each outer mold there is a core member provided with inner vibrating means and being movable upward into the outer mold, when this is in its molding position; with means for filling concrete into the outer molds during the upward movement of the cores, during which the lower end of the mold space between each outer mold and the appurtenant core is closed by means of a supporting ring adapted to form the lower edge of the pipe, and in which after each molding operation the outer molds are moved upward, and the cores downward so that the pipes molded can be removed from the mold members.

Hitherto known machines of this type are provided with a track disposed transverse to the direction of the row of forms and along which baseplates on wheels may pass, each baseplate having a hole through which the cores may pass, these holes being in turn enclosed by the supporting bottom ring positioned on the plate. Hence, the molded pipes are supported on the portable baseplate that, upon removal of the outer molds and the cores from the pipes, can be moved away from the molding position, whereafter a new baseplate is rolled into position. Considering that such baseplates are rather expensive, each machine is equipped with only a limited number and, as a consequence, the newly molded pipes must, as soon as possible after the molding, be removed by hand from the baseplates and carried to a curing area. Although a machine of this type, as far as the molding operation proper is concerned, may be designed for automatic function, manpower is required for operation of the baseplates to ensure that the rings are placed coaxial to the cores and the outer molds and this centering must, moreover, be effected during a very slow last part of the lowering of the outer molds to ensure the exact centered positions of the rings.

An object of the invention is to provide a machine of the type referred to being not only essentially simpler and cheaper, in regard to manufacture as well as utilization, than the hitherto known machines, but permitting also fully automatic operation to such an extent that manual operation, if required, will be without any importance to the operational speed of the machine, and neither to its capacity of production.

With this object in view the new machine is provided with a plane, stationary molding table extending to both sides of the row of molds and having openings permitting passage of the core members, and further for use in the machine-supporting rings are provided each having a major outer diameter exceeding the inner diameter of the part of the lower inner face of the outer molds serving to form the lowermost portion of the outside of the pipes and each having a smooth underside permitting the rings to slide on the molding table, whereas the machine is provided with a slide reciprocably arranged on the molding table and connected to moving means so that when operated it pushes the supporting rings with the newly molded pipes along the molding table away from the row of outer molds. The stationary molding table required replaces only the plate otherwise required for covering of the pit in the factory floor into which the core members descend when withdrawn. The slide and the moving means therefore are in no case more expensive than are the corresponding devices for the baseplates of the hitherto known machines. The supporting rings can be produced at a low cost, wherefore a machine may be equipped with a very large number of such rings without any considerable capital investment being required. Owing thereto that the major outer diameter of the bottom rings exceeds the major outer diameter of the pipes molded, the rings, in being pushed away from the molding position by means of slide, will engage the supporting rings of previously molded pipes without involving any risk of direct contact between the pipes proper, and the movement of previously molded pipes will make them spread fanwise with the rings rolling against one another, over the part of the molding table to be found behind the row of molds, or a floor flushing with this table, or a corresponding platform, in such a manner that the pipes will collect into a close assembly. As a consequence, the pipes produced may be removed from the machine at relatively long intervals, for example once a day, or they may be pushed onto a conveyor belt taking them through a steam chamber, for steam curing, whereby the supporting rings will be available for reuse at the earliest possible time.

In the new machine plain pipes may be produced. However, the machines are designed fist of all for molding socket pipes, with the socket end facing downwards. For molding such pipes the hitherto used supporting rings are provided with, or incorporate, a profile ring serving to form the inner surface of the socket of the concrete pipe, and enclosing the core in the molding position.

Another object of the invention is to provide machines of the type referred to provided with profile rings which are independent of the supporting rings and always mounted in the machine, so that only a little number of these more complicated profile rings is required in spite of the great number of supporting rings necessary for the new machine, which supporting rings thereby may be made very simple themselves.

A further object of the invention is to provide a machine of the type referred to in which before each molding operation the supporting rings are automatically placed ed on the molding table coaxial to the outer molds, so that no manual handling is required for ensuring the necessary centering of the rings.

Other objects and advantages of the present invention will become apparent from the following description, the claims and the accompanying drawings showing, by way of example only, an embodiment of the machine according to the invention.

In the drawing:

FIG. 2 is a front elevational view of the part, above floor level, of the machine shown in FIG. 1, seen from the left in FIG. 1;

FIG. 3 is a vertical longitudinal section through a slide incorporated in the machine;

FIG. 4 is a top view of the slide shown in FIG. 3; and

FIG. 5 is a cross-sectional view taken along the line V—V in FIG. 1, through the lower end of a single outer mold with adjoining parts, shown on an essentially larger scale.

Figure 1:
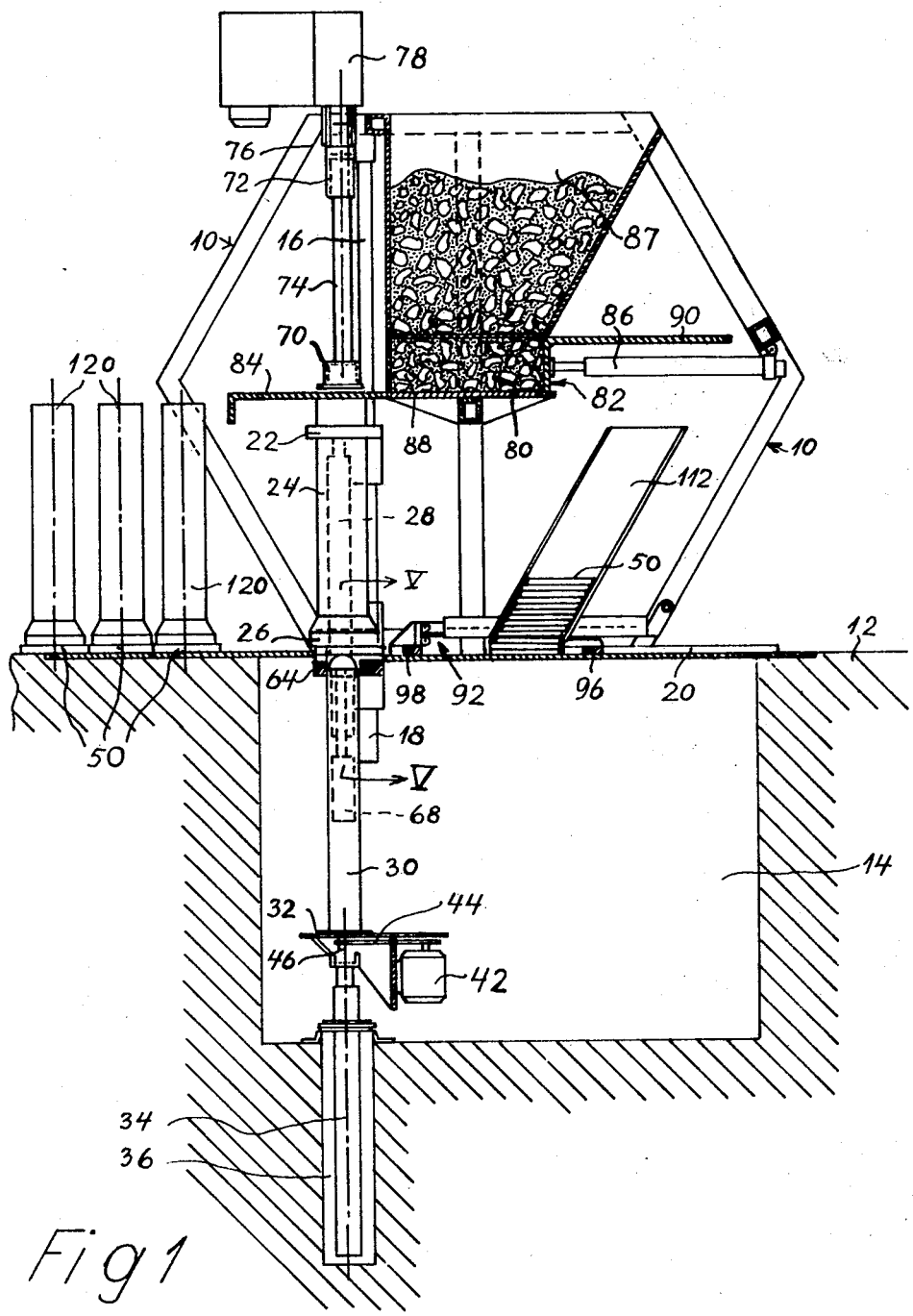
FIG. 1 is a schematical vertical sectional view of a machine embodying the aspects of the present invention.

The machine shown is provided with a frame structure comprising two interconnected side-members 10 located on opposite sides of a pit 14 in a factory floor 12. To each frame member 10 a vertical guide column 16 is attached, the lower part 18 thereof extending down into the pit 14. Between the frame members 10 the machine is provided with a molding table 20, consisting of a heavy steel plate extending beyond both ends of the machine and bridging the pit 14, and sunk into the flooring 12 in such a manner that the smooth upper surface of the plate is flush with the floor 12. Preferably at least behind the machine this is also covered with steel plates. Above the molding table axially movable and guided by the columns 16, a yoke 22, reaching between the frame members 10, is provided, and as appears from FIG. 2, four outer molds 24 are attached to this yoke 22, each having at the bottom end a wider socket part 26 serving to form the socket of the pipes. At both ends the yoke 22 is connected to a hydraulic piston device 28, by means of which the yoke 22, and in turn the outer molds 24 can be moved upwards from the lower molding position, shown in FIGS. 1 and 2, over a length corresponding approximately to the length of the outer molds 24.

Axially movable, and coaxial with each individual outer mold 24, the machine is provided with a core 30, in the position shown in FIG. 1 located in the pit 14, and having its top end below the upper side of the molding table 20. The core 30 is supported by a supporting member 32, common to all four cores and supported in turn by a hydraulic piston device 34 mounted in another pit 36 provided in the bottom of the pit 14. By means of the piston device 34 the core 30 can, from the position shown in FIG. 1, through a corresponding opening 38, see FIG. 5, in the molding table 20, be moved upwards into the corresponding outer mold 24, over a length corresponding to the length of the core 30 that exceeds somewhat the length of the outer mold 24, so that the semispherical top end 40 of the core 30 extends above the outer mold 24 when the core is in its top position. For each core 30 the supporting member 32 is provided with an electric motor 42, driving through a belt drive 44 a shaft 46 that extends up through the core 30 and serves to operate a vibrator 48 at the upper end of the shaft, see FIG. 5.

IN its molding position, as shown in FIGS. 1 and 5, the outer mold 24 rests on a detachable supporting ring 50 placed below the mold and having in the molding position shown in FIG. 5, its inside in alignment with the corresponding opening 38 in the molding table 20, the major outer diameter of the ring, at the bottom edge thereof, being equal to the major outer diameter of the corresponding socket member 26 of the outer mold 24. The upper, somewhat reduced part of the supporting ring 50 is tapered on the outside 52, and the lower edge of the socket part 26 of the outer mold 24 is provided with a corresponding inside taper 54, so that the outer mold 24, when lowered onto the supporting ring 50, and provided the ring is in approximately centered position in relation to he outer mold 24, will secure, on the one hand, exact centering of the supporting ring 50 and, on the other hand, tight closure of the joint between the supporting ring 50 and the socket member 26.

In the position shown in FIGS. 1 and 5, a profile ring 56 preferably made of rubber or a similar resilient, noncompressible material, is, moreover, extending into the socket part 26 of the outer mold 24, for forming the inside of the socket of a concrete pipe.

The inner diameter of the profile ring 56 is equal to the outer diameter of the core 30 to ensure a tight fit, when the core 30 moves upward through the profile ring 56. Moreover, the major outer diameter of the profile ring 56 corresponds to the inner diameter of he supporting ring 50, so that a tight fit to the bottom ring 50 is likewise ensured. The profile ring 56 is affixed to the upper side of a stabilizing ring 58, supported on a ring 60 which, by means of an intermediary ring 62, is attached to the upper side of a yoke 64 reaching transverse to the direction of the machine under the casting table 20, the yoke 64 having openings 66 for the cores 30.

At both ends the yoke 64 is guided by the lower ends 18 of the guide columns 16 through an axially movable arrangement and is likewise at both ends connected to a hydraulic piston device 68 by means of which the yoke 64, from the top position shown in FIG. 5, can be moved downward to a bottom position in which the upper sides of the profile rings 56 are located below the upper surface of the molding table 20.

Coaxially to each outer mold and just above the top thereof, in the position of the outer mold shown in FIG. 1, a hat-shaped thrust member 70 is provided, attached to the lower end of a piston rod 74 of a hydraulic piston device 72, by means of which the thrust member 70 so axially movable. The thrust member 70 can, with a slight play, be introduced into the upper part of the outer mold 24, and can with a slight play pass over the top end of the core 30, whereby its bottom face thus introduced between the core 30 and the outer mold 24 can serve to produce a suitable finish of the top edge of the concrete pipe molded. The hydraulic piston device 72 is attached to a supporting traverse 76 extending over and across the machine and pivotally suspended at both ends in the side frame members 10, sd that the piston device 72 and thereby also the thrust member 70 can be swung out in clockwise direction from the position shown in FIG. 1. The piston rod 74 extends beyond the upper side of the device 72 and engages a driving device 78 mounted on the supporting traverse 76, whereby an alternating swinging movement can be applied to the rod 74 and in turn to the thrust member 70, with a view to application of a smooth finish to the top edge of the pipe. This particular driving device 78 constitutes no part of the present invention and shall, therefore, not be referred to in more detail.

On a supporting plate 80 mounted in the frame 10 behind the row of external forms 24 and in level with the top ends of the outer molds 24, when these are in the position shown in FIG. 1, a batching box 82 consisting of four sidewalls is placed. To the top ends of the outer molds 24 a horizontally located slide plate 84 is affixed, provided with openings fitting tightly around the upper ends of the outer molds 24, and joining closely with rear edge the edge of the supporting plate 80, when the outer molds are in the position shown in FIG. 1. The slide plate 84 has, measured in the longitudinal direction of the machine, a length slightly in excess of the length of the batching box 82. The batching box, in the position shown in FIG. 1, is located immediately below a concrete hopper 87, from where it is filled automatically with concrete and is connected to a hydraulic piston device 86 connected to the frame 10, by means of which device 86 the box 82 can be moved forward from the position shown in FIG. 1, thus passing over the slide plate 84 and, in turn, over the open top ends of the outer molds 24, whereby the concrete is discharged into the outer molds 24. During this forward movement over the slide plate 84 the front wall 88 of the box will engage the thrust members 70, whereby they are swung away from their position directly over the outer molds 24, to which position the will revert automatically, however, when the batching box 82 is subsequently withdrawn. The batching box 82 is provided at the upper edge with a shutter plate 90 extending rearwards and serving to close the hopper 87 when the batching box 82 is moved forward.

The machine is provided, moreover, with a slide device 92 arranged on the molding table 20. This slide device may be reciprocated in the longitudinal direction of the machine by means of two hydraulic piston devices 94 located, one on each side of the slide device 92, in the frame 10. An embodiment of such a slide device is shown in FIGS. 3 and 4. This slide device 92 is provided with two spaced slide portions, a ring slide portion 96 and a pipe slide portion 98. The two slide portions 96 and 98 are located between two frame members 101, to which the ring slide portion 96 is secured. The pipe slide portion 98 is, however, provided at its rear end with a vertical or upright wall 100 having lugs 102 on the rear side, whereby the pipe slide portion 98 is pivotally connected to the frame members 101. Above the lugs 102 the wall 100 is provided, moreover, with two lugs 104 at each end, to which the piston rods of the two piston devices 94 are pivotally connected. Each frame member 101 is provided with a stop 106 against which the lower part of the wall 100 can bear when the pipe slide portion 98 is in the position shown in FIG. 3, and with a stop 108 extending above the upper edge of the frame member for limiting the rearward swinging of the wall 100 in engaging the lugs 104. Owing to the construction of the slide, when the slide is moved forward by means of the piston devices 94, the pipe slide portion 98 will be forced down to bear against the table 20, whereas during a rearward movement it will swing upwards, turning on the pivotal connection with the side members 101, so that the slide portion 98 will be raised from the molding table 20, to such an extent that the minimum space between the table and this slide portion is greater than the maximum height of the supporting rings 50. Each slide portion 96 and 98 is provided at its front edge with four angular incisions bordered by side edges 110, each of the longitudinal centerlines of these incisions intersecting the axis of one of the outer molds 24.

In the initial position of the slide 92, shown in FIG. 1, the pipe slide portion 98 is located immediately behind the bottom rings 50 engaging the outer molds 24, and the ring slide portion 98 behind a following row of corresponding bottom rings 50 coming from a ring magazine 112 arranged in the frame 10 and having a tubular magazine for each outer mold 24. The piston devices 94 are so adjusted that in the extreme near position of the slide 92 the rings 50, engaged by the ring slide portion 96 and centered by the edges 110 of the incisions, with a relatively high accuracy; are brought into centered positions over the openings 38 for the cores.

The hydraulic piston devices 28, 34, 68, 86 and 94 referred to in the preceding are all powered and controlled from one joint central control unit, not shown, this unit being preferably electrohydraulic and fully automatic, as will appear in more detail from the following. Such automatically functioning central units are commonly known and utilized and, as a consequence, require no detailed description.

The operation of the machine shown is substantially as follows:

The members of the machine are assumed to be in the initial positions shown in FIGS. 1, 2 and 5, corresponding to the positions immediately before commencement of a molding operation. By means of the piston device 34 the cores 30 are now moved upwards, into the outer molds 24, and at the same time, by means of the piston devices 86, the batching box 82 is moved forward over the upper ends of the outer molds 24, whereby concrete is discharged into the outer mold. Filling of concrete into the molds is commenced when the top ends of the cores 30 have passed through the profile rings 56. Owing to the vigorous vibration of the semispherical top ends of each core 30, the concrete initially discharged will be flung out into the space of the outer mold around the profile ring 56 and thus form the socket end of the pipe being molded. As a consequence of the properties of the material used for the profile ring 56, the socket end will, moreover, be particularly strongly vibrated, and all air will escape before the filling is continued. As the supply of concrete continuous the cores 30 are moved upwards through the outer molds 24, and the concrete supplied is simultaneously vibrated until the outer molds have been filled and the top ends of the cores 30 have been raised to such an extent that their top ends 40 are above the top ends of the outer molds 24.

Just before the cores ascend over the outer molds the piston device 86 is activated for withdrawal of the batching box 82, whereby the thrust members 70 are brought into position over the outer molds 24 and immediately thereafter, under constant pressure from the piston device 72 forced down into the upper ends of the outer molds 24, surrounding the top ends of the cores 30, for compression and forming the top edges of the pipes being molded. Through the driving device 78 an alternating swinging movement is simultaneously applied to the thrust members 70 with a view to smoothening of the end surfaces of the pipes. On completion of this smoothening operation, and while the thrust members 70 are still pressing against the top ends of the pipes molded, the piston device 28 and 34 are activated, whereby the outer molds 24 are moved upward and withdrawn from the pipes molded, at the same time as the cores 30 are pulled downward, out of the pipes. Moreover, the piston devices 68 are activated, whereby the profile rings 56 are moved downward until their top sides are below the upper surface of the table 20, and at the same time the piston devices 72 are activated for raising the thrust members 70. When the outer molds 24 have reached their top position and the cores their bottom position, the pipes molded 120 are standing freely, resting on the supporting rings 50. Immediately before the pipes are entirely free the piston devices 94 are activated, and the slide 92 is moved forward, whereby the pipe slide portion 98 engages the bottom rings 50 supporting the just molded pipes and pushes these rings ahead, whereby these rings 50 engage corresponding rings, supporting the pipes produced by the previous molding operation, so that these latter rings are pushed ahead, which in turn results in all of the pipes molded by preceding operations, now standing on the molding table 20 as well as on the floor at the end of the table, being pushed forward with a rolling movement, more or less fanwise, thus forming a compact group of pipes, which, however, due to the dimensions of the supporting rings, will not come into direct contact. At the same time four rings coming from the magazine 112 have been pushed forward by the ring slide portion 96 to a position in alignment with the outer molds, and four new rings have come to rest on a rearward extension 122 of the ring slide portion 96. The slide 92 is now withdrawn to the initial front position shown in FIG. 1, the pipe slide portion 98 being swung upward during this movement, so that it cannot engage the supporting ring 50 just centered above the openings 38. Simultaneously with the activation of the piston device 93 for withdrawal of the slide 92, the piston devices 28 for the outer molds 24 are activated, so that these molds move downward to engage the supporting rings 50 just moved forward, and shortly before completion of this movement the piston devices 68 are activated, and thereby the profile rings 56 are displaced upward through the supporting rings 50, to the initial position shown in FIG. 5, and the next working cycle can be initiated just at the moment the outer molds have reached their molding position shown.

Thus, by the present invention there is or the first time obtained a machine for molding a number of pipes simultaneously, which machine requires no manual handling whatsoever. The manual work involved is limited to periodic refilling of the ring magazine 112. This ring magazine is conveniently provided with two indicating devices, one of these switching on a pilot lamp and/or activating an audible signal when only a certain small number of rings remain in the magazine, and the other stopping the machine when the last rings have been pushed out. Also the concrete hopper may be furnished with control devices, indicating when refilling of the hopper is required.

What we claim is:

1. A machine for simultaneous molding of a number of concrete pipes, comprising, in combination: a supporting frame; a vertical molding table stationarily arranged in said frame and having an upper surface defining a smooth sliding face; said table being provided with a number of through openings arranged in a row; said table having an inlet portion at one side of said row and an output portion on the opposite side of said row; said output portion having a length of several meters; for each said opening; an outer mold axially displaceably arranged in said frame coaxial to said opening and having an open upper end and an open lower end, said lower end having an effective inner face adapted to form the outer face of the lowermost end of a pipe to be molded within said outer mold, said effective inner face having a first diameter; said outer mold being displaceable between an upper idle position and a lower molding position; a core having a closed top end and being axially displaceably arranged in said frame, displaceable between a lower position, in which said core is arranged below said table with its said top end below said sliding face and an upper position in which, when said outer mold takes up its said molding position, said core extends through said opening into said outermold to the upper end thereof, thereby together with said outer mold defining a pipe-shaped mold space; vibrating means arranged within said core, and driving means connected to said vibrating means for driving thereof; further first moving means in said frame connected to said outer molds for displacing the same; second moving means in said frame connected to said cores for displacing the same; concrete-filling means arranged in said frame above said upper ends of said outer molds when these take up their said molding positions and adapted to fill concrete into said mold spaces during the said displacement of said cores from their said lower positions towards their said upper positions; a number of supporting rings adapted before each molding operation to be arranged on said table one for each said opening and coaxial thereto, each said ring having an upper surface adapted in cooperation with said effective inner face of said lower end of the corresponding one of said outer molds to form the lower edge of a pipe to be molded, and a lower portion having a major outer diameter larger than said first diameter; each said supporting ring having a smooth lower face adapted to slide on said sliding surface of said table; a slide having a slide edge and arranged on said table reciprocably transversely to said row between a front position, in which said slide edge is situated above said inlet portion of said table in front of said openings and a rear position in which said slide edge is situated above said output portion of said table behind said row of openings, said slide thereby during movement between said front position and said rear position engaging said supporting rings for displacing the same and the pipes just molded and supported thereof for displacing the same onto said output portion of said table.

2. A machine as defined in claim 1 and adapted to mold socket pipes with the socket end facing downwards during the molding, further comprising for each said opening: a profile ring adapted to form the inner side of the socket of a pipe to be molded, said profile ring being axially displaceable relative to said core as well as to each of said supporting rings arranged on said table coaxial to said opening, said profile ring being arranged coaxial to said opening and being adapted closely to surround said ore during the vertical displacement of the same, said profile ring having an uppermost end face and being arranged axially displaceable between a lower ring position in which said uppermost end face is positioned below said sliding surface of said table, and an upper ring position in which said profile ring extends into said outer mold closely surrounded by said supporting ring; fourth moving means being arranged in said frame connected to said profile rings for displacing the same.

3. A machine as defined in claim 2, said profile ring being made from a resilient, noncompressible material such as rubber.

4. A machine as defined in claim 1 further comprising a supporting ring magazine arranged in said frame above said input portion of said table; said magazine being provided for each said opening with a magazine portion adapted to take up said supporting rings, said slide comprising a first slide part provided with said slide edge and a second slide part arranged behind said first slide part in a distance therefrom, said second slide portion having a front edge provided for each said opening with centering means adapted during said displacement of said slide from its front position towards its rear position to take up a ring from the corresponding one of said magazine portions, displacing said ring towards said opening in said rear position of said slide to center said ring relative to said opening, said first slide portion being displaceable upwards from said table, guide means connected to said first slide portion for displacing the same upwards and keeping it in raised position when passing said openings during displacement of said slide from its said rear position back to its said front position.

5. A machine as defined in claim 4, said slide comprising a slide frame, said first slide portion being pivotally connected to said slide frame about a pivot axis, said first slide portion having an upright extending above said pivot axis, said third moving means being connected to said upright above said pivot axis.

6. A machine as defined in claim 1, further for each said opening comprising a thrust member, said thrust member being connected to a moving device arranged in said frame for being axially displaced downwards from a first thrust member position immediately above the said upper end of said outer mold, when said outer mold is in its said molding position, into said open upper end of said outer mold to form the upper edge of the pipe to be molded; said thrust member being arranged in said frame pivotable about a second pivot axis; a concrete hopper being arranged in said frame at the one side of said outer molds; said filling means comprising a batching box having a front wall and being arranged in said frame vertically displaceable between a first position, in which it is situated below said concrete hopper with its said front wall situated in a distance from said outer molds and a rear position, in which it is positioned above said open upper ends of said outer molds, when the same are in their said molding position, with said front wall positioned at the other side of said row, said front wall thereby engaging said thrust members for pivoting them away from their said position above said outer molds, fifth moving means on said frame connected to said batching box for displacing the same.

7. A machine as defined in claim 6, each said thrust member being connected to its said moving device by means of connecting means guided for providing axial displacements only, said moving device being arranged in said frame pivotable about said second pivot axis.

8. A machine as defined in claim 1, said closed top end of said core being shaped as a semispheroid, said vibrating means being arranged inside said core at the upper end thereof.